Figure 1:
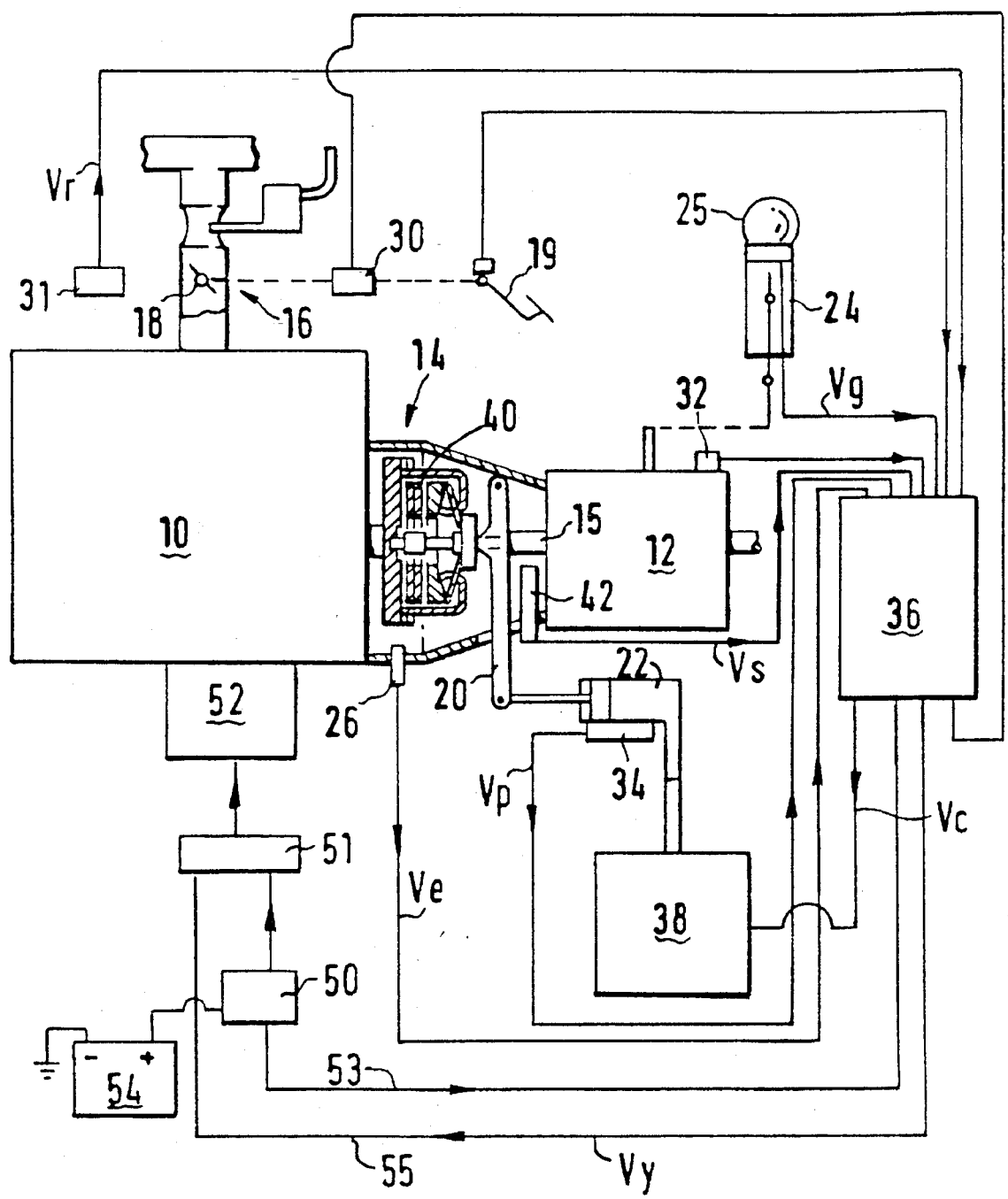

US005454768A

United States Patent [19]
Jones et al.

[11] Patent Number: 5,454,768
[45] Date of Patent: Oct. 3, 1995

[54] CLUTCH CONTROL SYSTEM

[75] Inventors: Charles J. Jones, Earlsdon; Paul V. Shepherd, Long Itchington, both of Great Britain

[73] Assignee: Automotive Products, plc, Leamington Spa, United Kingdom

[21] Appl. No.: 232,142
[22] PCT Filed: Sep. 7, 1993
[86] PCT No.: PCT/GB93/01896
  § 371 Date: May 4, 1994
  § 102(e) Date: May 4, 1994
[87] PCT Pub. No.: WO94/05522
  PCT Pub. Date: Mar. 17, 1994

[30] Foreign Application Priority Data

Sep. 9, 1992 [GB] United Kingdom ............... 9219101

[51] Int. Cl.$^6$ ............................................. F16H 59/68
[52] U.S. Cl. ...................... 477/83; 477/86; 477/90; 477/99
[58] Field of Search ..................... 477/83, 86, 90, 477/99, 167; 74/477; 192/3.58, 3.63

[56] References Cited

U.S. PATENT DOCUMENTS

| 4,518,064 | 5/1985 | Windsor | 477/86 X |
| 4,671,397 | 6/1987 | Asagi et al. | 477/86 |
| 4,807,135 | 2/1989 | Tami. | |
| 5,005,687 | 4/1991 | Kurihara et al. | |
| 5,072,815 | 12/1991 | Javis | 477/83 X |

FOREIGN PATENT DOCUMENTS

| 2088007 | 6/1982 | United Kingdom. |
| 2212238 | 7/1989 | United Kingdom. |
| 2250075 | 5/1992 | United Kingdom. |
| 9213208 | 8/1992 | WIPO. |

Primary Examiner—Charles A. Marmor
Assistant Examiner—Peter Kwon
Attorney, Agent, or Firm—Paul E. Milliken; Lee A. Germain

[57] ABSTRACT

A clutch control system for a motor vehicle having an engine (10), a gearbox (12) having a plurality of gear ratios, and a clutch (14) providing a drive connection between the engine and the gearbox. The control system includes a clutch actuation means (22) for controlling the state of engagement of the clutch and a control unit (36) which receives signals from a plurality of vehicle operating parameter sensors including a gear sensor (32) which indicates that a gear ratio is engaged in the gearbox. The control unit (36) processes these signals to produce a command signal for operation of the clutch actuating means. The control unit (36) ensures that if on powering-up of the control unit (36) the control unit receives a signal from the gear sensor (32) indicating that a gear ratio is engaged in the gearbox (12), the control unit inhibits disengagement of the clutch (14) by the clutch actuation means (22).

12 Claims, 3 Drawing Sheets

CLUTCH CONTROL SYSTEM

The present invention relates to a clutch system for a vehicle.

The applicant's earlier patent GB2088007 and pending PCT patent application WO92/08065 describe clutch control systems for achieving progressive engagement of a vehicle clutch to provide a smooth clutch take up from a vehicle at rest condition.

The control logic of the above clutch control systems can prove disadvantageous in a hill start situation and can result in inadvertent rolling of a vehicle parked on an incline at start up when the vehicle is left in gear to supplement, or instead of using, the parking brake. Furthermore in such systems, if the engine cannot be started due to failure or partial failure of the self starting system, the engine cannot be started by any of the commonly accepted emergency starting means such as push-starting or tow-starting.

It is an object of the present invention to provide a clutch control system which mitigates the above problems.

According to the present invention there is provided a clutch control system for a vehicle having an engine, a gearbox having plurality of gear ratios, and a clutch providing a drive connection between the engine and the gearbox, the control system comprising a clutch actuation means for controlling the state of engagement of the clutch, a control unit which receives signals from a plurality of vehicle operating parameter sensors including a gear sensor which indicates that a gear ratio is engaged in the gearbox, the control unit processing these signals to produce a command signal for operation of the clutch actuating means, and an electrical power supply circuit for the control unit, the control system being characterised in that if on activation of the electrical power supply circuit to power-up the control unit the control unit receives a signal from the gear sensor indicating that a gear ratio is engaged in the gearbox, the control unit inhibits disengagement of the clutch by the clutch actuation means.

The control unit may also be arranged to inhibit operation of an engine starter circuit of the vehicle when clutch disengagement is inhibited.

Preferably the engine starter circuit includes a starter inhibit relay which is operated to inhibit operation of the starter circuit.

The control unit preferably deactivates the starter inhibit relay on receiving a signal that neutral has been selected in the gearbox.

Preferably an engine starter circuit activation sensor is provided and the control unit commands disengagement of the clutch on receipt of a signal from the starter circuit activation sensor indicating an attempt to start the engine when a gear ratio is engaged.

For a vehicle having a gear lever for selection of the operative ratio, the gear lever is preferably provided with a load sensor which indicates to the control unit when the gear lever is moved and the control unit on receipt of a gear lever movement signal from the load sensor commands the clutch actuation means to disengage the clutch.

Figure 2:
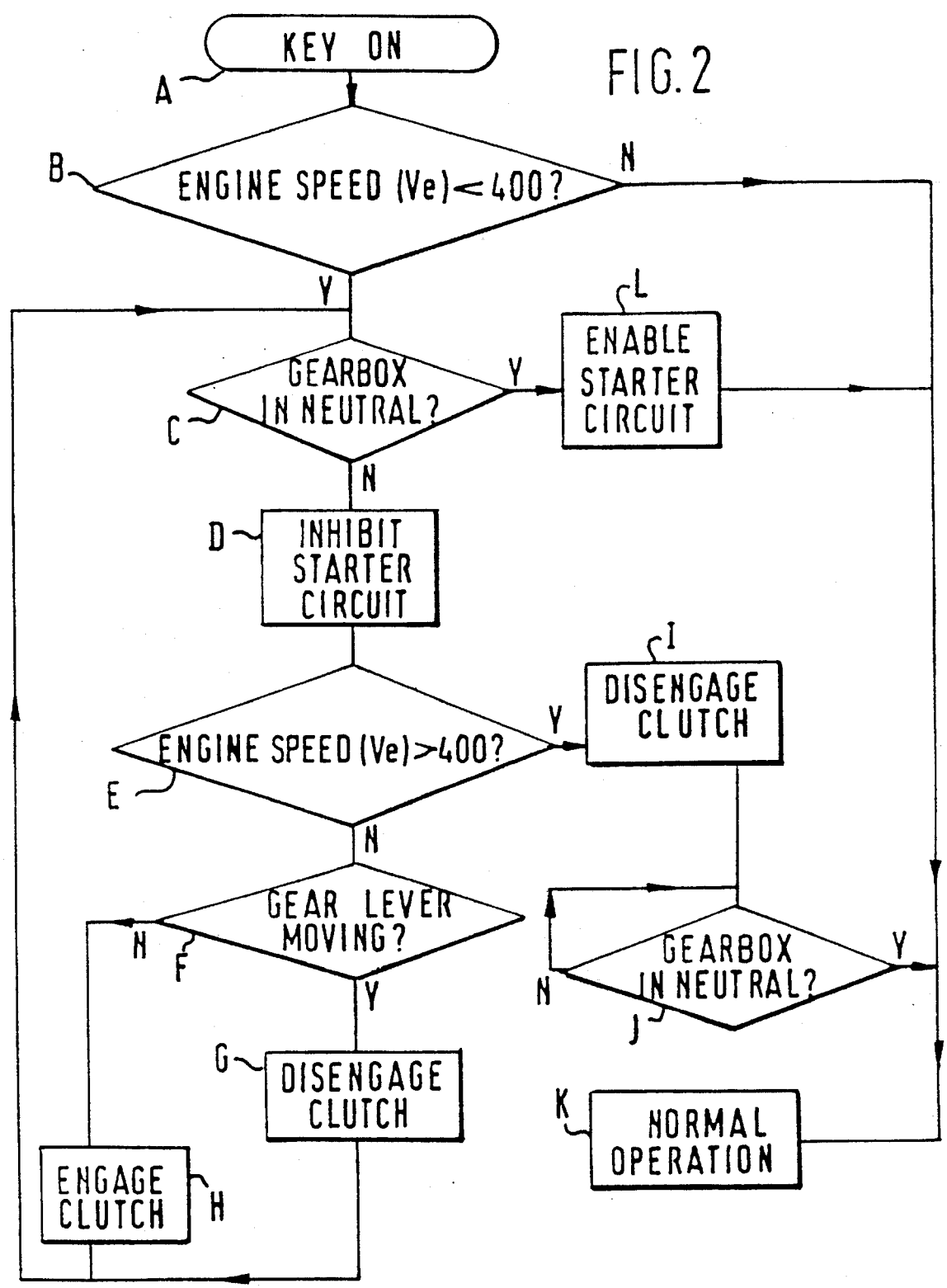
Figure 3:
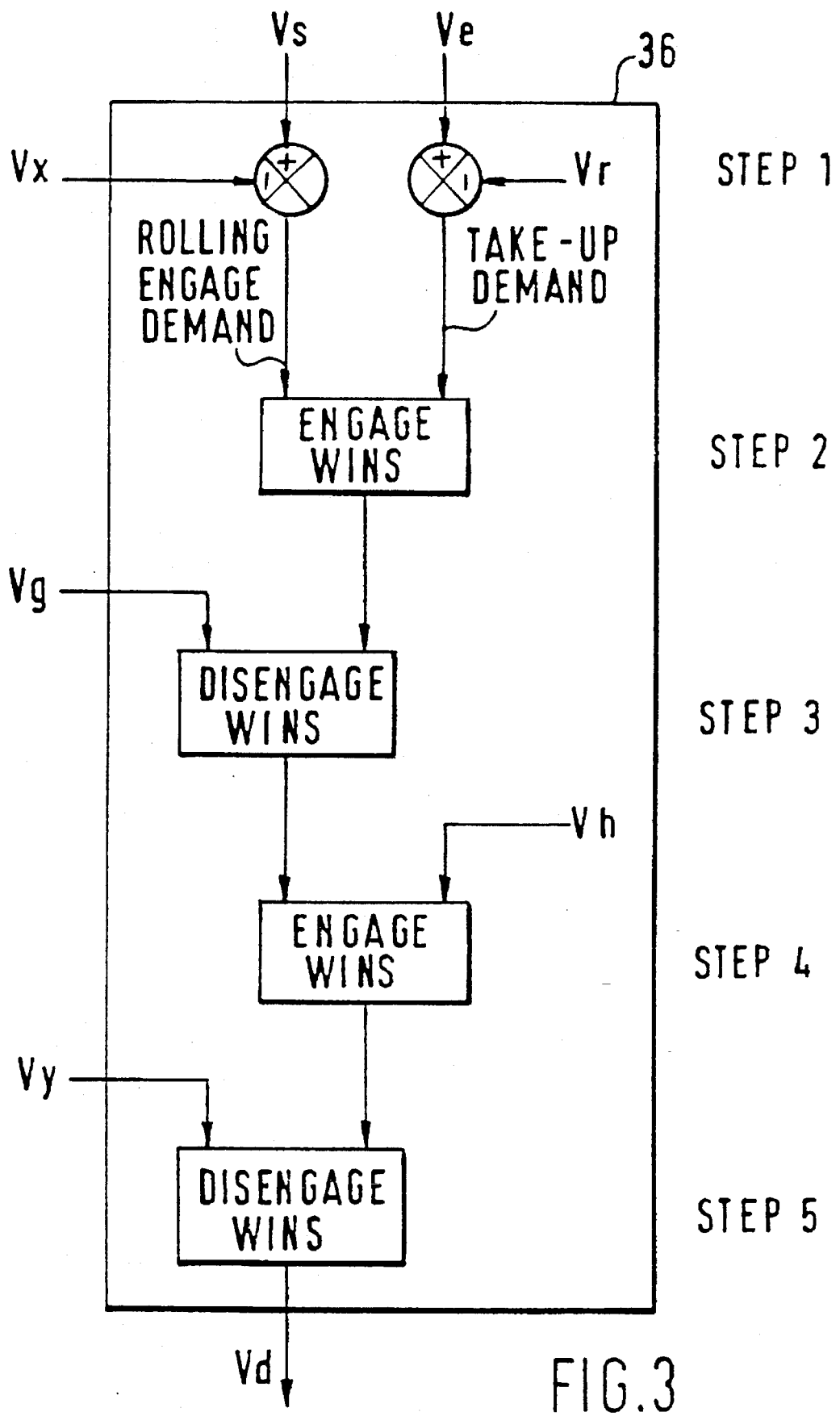

The invention will now be described, by way of example only, with reference to the accompanying drawings in which:

FIG. 1 is a schematic drawing of a control system according to the present invention, and FIGS. 2 and 3 are block diagrams showing the logic steps used in a microprocessor of a control unit used in the control system of FIG. 1.

Referring to FIG. 1 a motor vehicle comprises an engine 10 and a gearbox 12 coupled through a clutch 14 via a gearbox input shaft 15. Fuel is supplied to the engine by a throttle 16 which includes a throttle valve 18 operated by accelerator pedal 19. The clutch 14 is actuated by a release fork 20 which is operated by a slave cylinder 22. The operative ratio of the gearbox is selected by a gear lever 24 having a load sensor 25 which senses when loads are applied to the gear lever to make ratio selections.

The clutch control system includes a series of sensors for sensing the state of the vehicle. The engine speed is monitored by an engine speed sensor 26 including a transducer which produces an engine speed signal Ve. The state of the throttle valve 18 is monitored by a throttle valve position sensor 30. The state of the gearbox 12 is monitored by a gear sensor 32 which provides an output signal indicative of the gearbox ratio currently engaged. The position of the slave cylinder 22, and thus the level of engagement of clutch 14, is monitored by an actuation sensor 34 which produces an output signal Vp.

Gear lever operation is monitored by load sensor 25. The speed of the gearbox input shaft 15, which is equal to that of a driven plate 40 of the clutch 14, is monitored by a driven plate speed sensor 42. Since the speed of the vehicle depends on the driven plate speed and the gear engaged, the driven plate speed sensor 42 acts in effect as a vehicle speed sensor to produce a vehicle speed signal Vs.

Signals from the sensors are transmitted to a microprocessor control unit 36 which receives its electrical power via line 53 from a vehicle battery 54 via a conventional key-operated switch 50. Control unit 36 using its control logic generates a clutch position signal Vc which is issued to an hydraulic control 38 which controls the position of slave cylinder 22. Such a system is described in detail in the applicants published PCT application WO 92/08065 to which the reader is directed if further details are required.

The clutch control system also includes a reference signal generator 31 which produces a reference signal Vr. On clutch take-up from a vehicle "at-rest" position the degree of clutch engagement is determined by the difference between the reference signal Vr and the engine speed Ve, so that when the engine speed signal Ve is less than the reference signal Vr the control unit 36 demands clutch engagement. Such a control system is described in British Patent GB2088007 to which the reader is again directed if further details are required.

The vehicle has an engine starter circuit which includes the key switch 50, a starter inhibit relay 51 and a starter motor 52 which includes a starter relay (not shown). The inhibit relay 51 is connected to the control unit 36 via line 55 so that the control unit can issue a signal Vy to the inhibit relay 55 to inhibit operation of the starter motor.

FIG. 2 illustrates the start-up procedure of the control unit 36 which utilizes the present invention.

On operation of key switch 50 the control unit 36 is powered-up via line 53, see step A of FIG. 2.

The control unit then checks at step B whether the engine speed signal Ve from sensor 26 indicates that the engine speed is less than a predetermined level (eg. 400 r.p.m). If the engine speed is less than 400 r.p.m., indicating a start-up condition, the control unit moves into step C, if not the control unit leaves the start-up procedure to commence normal operation as indicated by box K in FIG. 2. Thus engine speed sensor 26 also acts as an engine starter circuit activation sensor.

At step C the control unit checks whether the gearbox is in neutral and if so disables starter inhibit relay 51 (see box L) to allow the starter motor to crank the engine and returns the system to normal operation at K. The normal operation logic includes the provision to re-inhibit operation of the starter circuit should the driver inadvertantly again move the gear lever out of neutral during the start-up procedure.

If the gearbox is in gear, as for example when the vehicle has been left parked in gear on an incline, the control unit produces an inhibit relay signal Vy (see step D) which is passed to inhibit relay 51 via line 55 to interrupt the passage of current to the relay (not shown) of starter motor 52 thus inhibiting operation of the starter circuit. The control unit then moves on to step E where it checks whether the engine speed is above a predetermined level (eg. 400 r.p.m.). If the engine speed is above 400 r.p.m., indicating that the starter and circuit inhibit has failed and that the engine start motor 52 is cranking the engine, the clutch is disengaged at step I to prevent inadvertent movement of the vehicle. The vehicle is returned to normal operation at K by the selection of neutral which is tested in step J.

If the engine speed is less than 400 r.p.m. at step E, indicating that the starter circuit has not been activated, the control unit next tests at step F whether the gear lever sensor 25 is indicating that the vehicle driver is moving the gear lever and therefore in proper control of the vehicle. If step F gives a "No" answer the system maintains the clutch 14 engaged, see step H, in order to retain the engine braking effect so that the vehicle will not begin to roll unexpectedly. If step F produces a "Yes" answer, indicating that the driver is in control of the vehicle and assumed to be aware that engine braking is operating, the control unit allows disengagement of the clutch 14 at step G.

Thus, as will be appreciated from the above, in the normal hill start situation with the vehicle parked in gear the control unit 36 uses steps A.B,C,D,E,F & H to ensure that the clutch is maintained engaged and the engine braking retained. When the driver moves the gear lever the clutch is disengaged by step G of the control sequence.

If the starter inhibit fails, resulting in a "Yes" answer at step E then the clutch is disengaged at step I to prevent or minimise sudden unexpected movement of the vehicle. The control unit is returned to normal operation at K by the selection of neutral in the gearbox at step J.

FIG. 3 diagrammatically shows how the hill park feature of the present invention operates with the operating parameter signals received by the control unit 36 to produce the clutch command signal Vc using a series of engage-wins and disengage-wins operators.

The individual demand generators each generate a clutch position demand from selected system variables. The engage-wins and disengage-wins operators determine which individual demand shall take precedence and determine which demand the clutch position control shall respond to. FIG. 3 shows the logic sequence in which demand generators and wins operators function.

The sequence starts at step 1 by generating clutch engagement demands, a first "rolling engage demand" generated by a vehicle speed signal Vs which is compared with a vehicle speed reference Vx, and a second "take-up demand" generated by an engine speed signal Ve which is compared with an engine speed reference signal Vr. This sequence of operation is described in detail in WO 92/08065.

At step 2 both the demands are fed into an engage-wins operator so that the demand that calls for the greatest degree of clutch engagement takes precedence.

In step 3, a disengage-wins operator receives the engage signal from step 2, and a disengage signal Vg from the gear lever load sensor 25. This ensures that the clutch is always disengaged during gear changes irrespective of demands for engagement from step 1.

At step 4 an engage-wins operator receives a signal from step 3 and a hill park signal Vh. The hill park signal will be either a clutch fully engaged signal from step H of FIG. 2 or a clutch fully disengaged signal from step G of FIG. 2. This ensures, as described above, that the clutch remains fully engaged when the control unit is powered-up and the vehicle is in gear. To start the vehicle engine the gear lever 24 is first put into neutral allowing the gear shift signal Vg and the take up demand signal to cause the clutch to disengage. In the final step 5, a disengage-wins operator receives a signal from step 4 and a start inhibit relay signal Vy. The start inhibit signal Vy demands either full clutch engagement for normal operation or full clutch disengagement in the event of a failure to relay 51 having been detected.

The final clutch position demand signal Vd from step 5, is compared in the control unit 36 with the actual clutch position feedback signal Vp to produce the clutch command signal Vc which is fed to the clutch hydraulic control 38.

It will be appreciated that the key switch 50 could be replaced by any other suitable form of switch such as by a coded card or a push button digital input.

Also, failure of the starter inhibit can be detected in a variety of other ways than by the presence of a signal Ve from the engine speed sensor 26. For example, a signal could be taken from the terminals of inhibit relay 51 to indicate its operation or non-operation.

It will also be appreciated that the inhibit relay 51 could be replaced by an enable relay whose natural state would open-circuit the starter circuit.

As will be understood by retaining clutch engagement a start-up when a gear is engaged not only is engine braking preserved but push or tow-starting also becomes possible in view of the maintenance of the drive connection between the vehicle wheels and the engine. The additional inhibiting of the starter circuit also enhances the safety aspects of the system.

We claim:

1. A clutch control system for a motor vehicle having an engine (10) a gearbox (12) having a plurality of gear ratios, and a clutch (14) providing a drive connection between the engine and the gearbox the control system comprising a clutch actuation means (22) for controlling the state of engagement of the clutch, a control unit (36) which receives signals from a plurality of vehicle operating parameter sensors including a gear sensor (32) which indicates that a gear ratio is engaged in the gearbox, the control unit processing these signals to produce a command signal (Vc) for operation of the clutch actuating means, and an electrical power supply circuit (50,53,54) for the control unit (36), the control system being characterised in that, if on activation of the electrical power supply circuit (50,53,54) to power-up the control unit (36) the control unit receives a signal from the gear position sensor (32) indicating that a gear ratio is engaged in the gearbox, the control unit (36) inhibits disengagement of the clutch (14) by the clutch actuation means (22).

2. A control system according to claim 1 for a vehicle having an engine starter circuit (50,51,52), the system being characterised in that the control unit (36) also inhibits operation of the starter circuit when clutch disengagement is inhibited.

3. A control system according to claim 2 characterised in that the engine starter circuit includes a starter inhibit relay (51) which is operated to inhibit operation of the starter circuit (50,51,52).

4. A control system according to claim 1 for a vehicle having an engine starter circuit (50,51,52) characterised by the provision of an engine starter circuit activation sensor (26) and in that the control unit (36) co hands disengagement of the clutch (14) by the clutch activation means (22) on receipt of a signal from the engine starter circuit activation sensor (26) and from the gear sensor (32) indicating an attempt to start the engine when a gear ratio is engaged.

5. A control system according to claim 1 for a vehicle having a gear lever for selection of the operative gear ratio characterised in that the gear lever (24) is provided which a load sensor (25) which indicates to the control unit (36) when the gear lever is moved, and in that the control unit on receipt of a gear lever movement signal from the load sensor commands the clutch actuation means (22) to disengage the clutch.

6. A control system according to claims 2 to 4 or claim 5 when dependent on claim 2 characterised in that the control unit (36) reactivates the starter circuit (50,51,52) on receipt of a signal that neutral has been selected in the gearbox (12).

7. A control system according to claim 1 characterised in that the control unit (36) is a microprocessor having a series of individual demand generators associated with clutch engagement-win and clutch disengagement-win operators which each generation of the command signal (Vc).

8. A control system according to claim 2 characterised by the provision of an engine starter circuit activation sensor (26) and in that the control unit (36) commands disengagement of the clutch (14) by the clutch activation means (22) on receipt of a signal from the engine starter circuit activation sensor (26) and from the gear sensor (32) indicating an attempt to start the engine when a gear ratio is engaged.

9. A control system according to claim 3 characterised by the provision of an engine starter circuit activation sensor (26) and in that the control unit (36) commands disengagement of the clutch (14) by the clutch activation means (22) on receipt of a signal from the engine starter circuit activation sensor (26) and from the gear sensor (32) indicating an attempt to start the engine when a gear ratio is engaged.

10. A control system according to claim 2 for a vehicle having a gear lever for selection of the operative gear ratio characterised in that the gear lever (24) is provided with a load sensor (25) which indicates to the control unit (36) when the gear lever is moved, and in that the control unit on receipt of a gear lever movement signal from the load sensor commands the clutch actuation means (22) to disengage the clutch.

11. A control system according to claim 3 for a vehicle having a gear lever for selection of the operative gear ratio characterised in that the gear lever (24) is provided with a load sensor (25) which indicates to the control unit (36) when the gear lever is moved, and in that the control unit on receipt of a gear lever movement signal from the load sensor commands the clutch actuation means (22) to disengage the clutch.

12. A control system according to claim 4 for a vehicle having a gear lever for selection of the operative gear ratio characterised in that the gear lever (24) is provided with a load sensor (25) which indicates to the control unit (36) when the gear lever is moved, and in that the control unit on receipt of a gear lever movement signal from the load sensor commands the clutch actuation means (22) to disengage the clutch.

* * * * *